APPARATUS FOR COMPOSING MESSAGES FOR TELEPHONIC TRANSMISSION

Filed April 7, 1966 Sheet 1 of 2

INVENTOR.
KENNETH R. SHARPLES

March 25, 1969 K. R. SHARPLES 3,435,421

APPARATUS FOR COMPOSING MESSAGES FOR TELEPHONIC TRANSMISSION

Filed April 7, 1966 Sheet 2 of 2

INVENTOR.
KENNETH R. SHARPLES

United States Patent Office 3,435,421
Patented Mar. 25, 1969

3,435,421
APPARATUS FOR COMPOSING MESSAGES FOR TELEPHONIC TRANSMISSION

Kenneth R. Sharples, Braintree, Mass., assignor, by mesne assignments, to DASA Corporation, Andover, Mass., a corporation of Massachusetts Filed Apr. 7, 1966, Ser. No. 540,866
Int. Cl. G11b *13/00*
U.S. Cl. 340—172.5 4 Claims

ABSTRACT OF THE DISCLOSURE

Apparatus for encoding a message to be transmitted in which means are provided for visually verifying the message before transmission. First and second magnetic recorders are provided, the first being operative to store coded data representing a message being compiled and the second being operative to store a verified message which is selectively stored in the second recorder from the first recorder and from a manually operable keyboard.

Figure 1A:
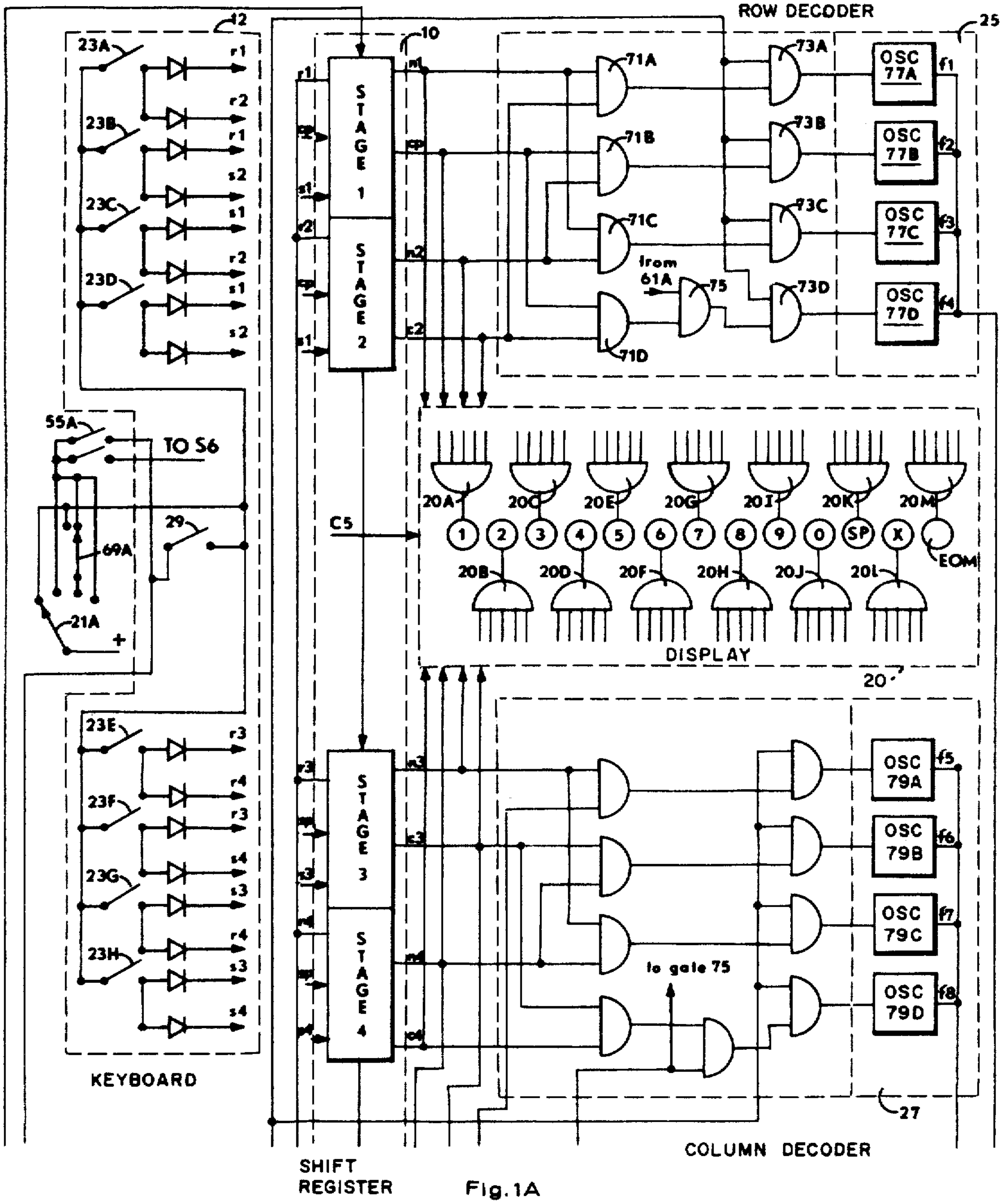

This invention pertains generally to data processing apparatus and particularly to apparatus of such type for recording digital information to be transmitted over telephone lines.

It is known in the art that digital signals may be efficiently transmitted over telephone lines by encoding such signals as sequential bursts of multi-frequency signals. It is also known that the required encoding may be controlled by a conventional punched card which is read whenever data is to be transmitted. However, even though punched cards are well adapted to controlling a multi-frequency oscillator, any transmission system using such cards is subject to inherent limitations. That is, since the capacity of any individual punched card is restricted, it is necessary that the length of any message to be transmitted be no longer than the length of message which can be recorded on a single punched card or that means be provided for collating and then reading a number of cards. In addition, the use of punched cards does not conveniently permit variable data, as signals from a manually operated keyboard, to be transmitted along with previously stored data.

Therefore, it is a primary object of this invention to provide an improved input device for coding a multi-frequency signal so that the length of any transmitted message may be varied within wide limits.

Another object of this invention is to provide means for "off-line" composition of complete messages, checking such messages for human error and then controlling a multi-frequency oscillator in accordance with the composed and checked message.

These and other objects of this invention are attained generally by providing: a magnetic recorder in which digital signals making up a complete message to be transmitted may be recorded, means for visually displaying, before recording and, character-by-character, the characters making up the message, means for sequentially controlling the display means and the magnetic recorder so that only verified digital signals are recorded, and a multi-frequency oscillator in circuit with a telephone line, such oscillator being adapted to generate appropriate signals when the recorded and checked digital signals in the magnetic recorder are played back.

Figure 1B:
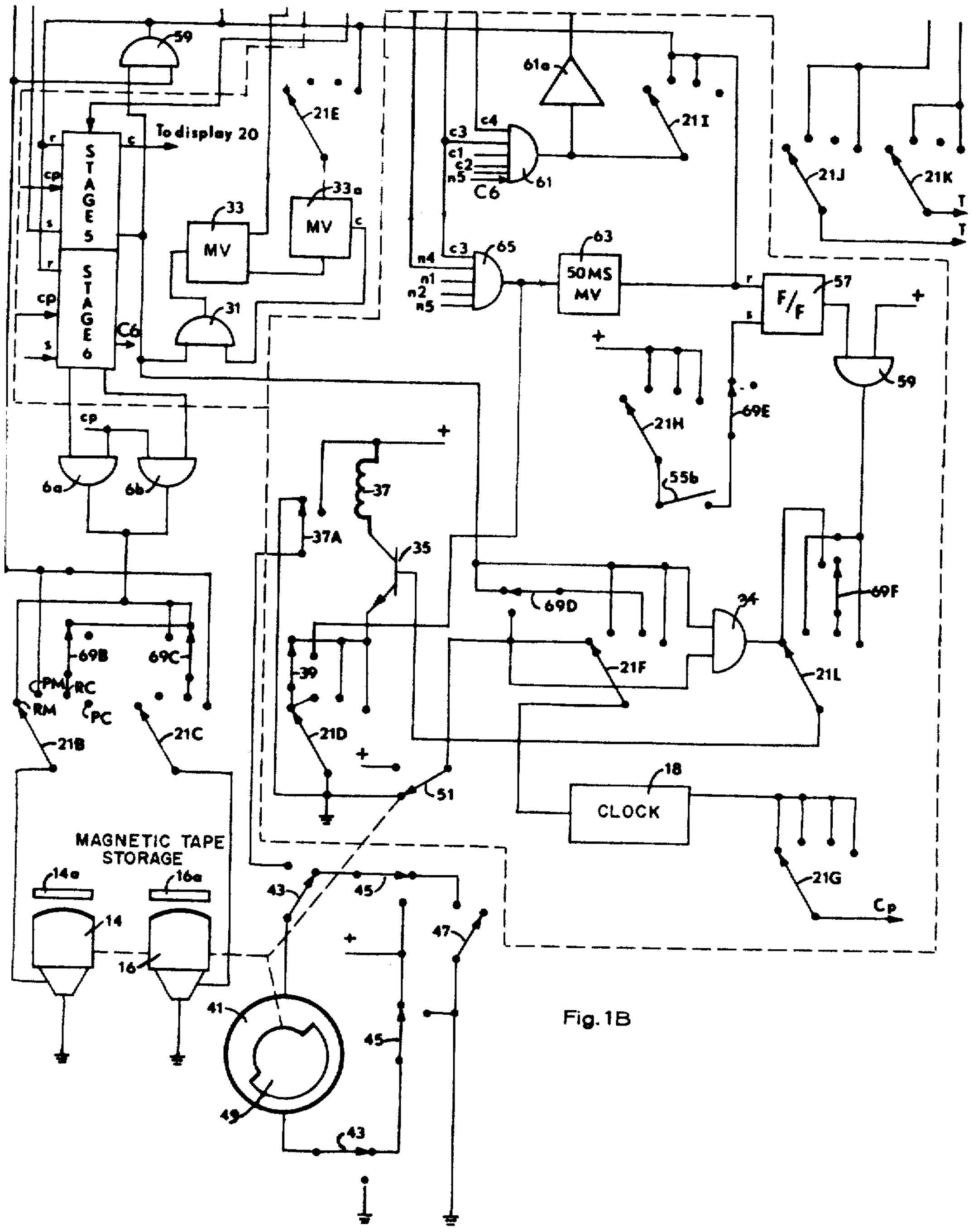

For a more complete understanding of the concepts here contemplated, reference is now made to the following detailed description of an embodiment of this invention as shown in the drawings in which:

FIGS. 1A and 1B, taken together, make up a combined block and logic diagram showing a complete circuit for composing, checking and transmitting messages. Before considering the figures in detail, it should be understood that well known components and subassemblies are utilized. Thus, for example, the keyboard may be a conventional keyboard as used in station apparatus in the telephone industry and the multi-frequency oscillator may be the so-called "Meacham" oscillator shown and described in U.S. Patent 3,184,554. Further, the magnetic transducers, the shift register and the various gating circuits are, per se, known in the art. In particular it should be understood that the circuits to be described may be used with the mechanical portions of the device shown and described in U.S. patent application, of Manfred Kuehnle Ser. No. 500,918 filed Oct. 22, 1965 entitled Data Indexing System and assigned to the same assignee as this application. In brief, the application just referred to shows an electronic dialer comprising a magazine for a magnetic tape, means for mounting such magazine so that the magnetic tape is pressed into contact with a magnetic transducer, tape drive means, including an electric motor and a gear train driven thereby, the gear train being meshed when the tape magazine is in its operative position, and controls for the electric motor to cause that element finally to move the magnetic tape longitudinally of itself and relative to the magnetic transducer. Only one significant change in the mechanism shown in application Ser. No. 500,918 would be required to adapt it to use with the circuit to be described in this application. That is, a second magnetic record medium and transducer must be added to take care of the compiling features here contemplated. Such an addition may, however, be accomplished simply by utilizing any well known magnetic tape recorder controlled by the later to be described circuit. It is therefore not deemed necessary for an understanding of this invention that the details of construction of the electro-mechanical elements used with the illustrated circuit be set forth.

Turning now to the figures, it may be seen that the circuit here contemplated comprises a shift register 10 having a number of stages (here designated stages 1 through 4) to store, as a parallel binary number, signals representative of any of the characters intended to be transmitted and an additional number of stages (here designated stages 5 and 6) which form different parallel binary numbers to control operation of the circuit in ways to be described. The shift register 10 is disposed to be loaded from a keyboard 12, or from either one of two transducers, 14, 16. The shift register 10 may be loaded or unloaded serially when a clock generator 18 is operated in a manner to be described. In other words, the illustrated shift register is disposed so that a two digit binary number may be stored in stages 1 and 2, a separate two digit binary number may be stored in stages 3 and 4 and a two digit control signal may be stored in stages 5 and 6 so that either a parallel or a serial binary number may be derived therefrom.

The illustrated circuit is shown to be adapted to operation in any one of four modes by positioning of a multi-deck selector switch 21A through 21K. The modes are indicated, from left to right on each section, as "RM" (meaning record in main memory) "PM" (meaning playback from main memory); "RC" (meaning record in compiler); and, "PC" (meaning playback from main compiler).

*"RM" mode of operation*

In the RM mode of operation, selector switches 21A through 21K are positioned as shown. With the selector switches 21A through 21K so positioned, it may be seen that the telephone lines "TT" are disconnected from the circuit (by selector switches 21J, 21K) and that transducer 14 is connected to stage number 6 of the shift register 10 (by selector switch 21B) and transducer 16 is disconnected (by selector switch 21C). The keyboard 12 is, via selector switch 21A, prepared for operation so that when any of the pushbuttons (not shown) is depressed a "row" switch and a "column" switch are closed. That is, one of the switches 23A, 23B, 23C, 23D and one of the switches 23E, 23F, 23G, 23H are closed to load via a diode matrix (not numbered) stages 1, 2, 3, and 4 of the shift register 10 to insert a parallel binary number therein. The normal and complementary output terminals of stages 1, 2, 3, and 4 are connected, as shown, to the display 20, to a row decoder 25 and to a column decoder 27.

The display 20 illustrated here simply comprises a plurality of enabling gates, 20A through 20M, each controlling a separate one of a similar plurality of indicator lamps (not numbered). Each one of the enabling gates 20A through 20M, further, is connected to the complementary output of stages 5 and 6. It may be seen, therefore, that the condition of stages 1, 2, 3, 4 of the shift register 10, i.e. the number stored, determines which one of the enabling gates 20A through 20M may be energized when a pushbutton is depressed and there are "zeroes" in stages 5 and 6 of the shift register 10. That is, first the operator of the system may observe the display 20 to be sure that he has actuated the desired pushbutton without any other effect. If the digit displayed is incorrect, the operator may release the depressed pushbutton and press the correct one, thus reloading stages 1 through 4 of the shift register 10 to change the display 20. As soon as the correct digit is displayed, a switch 29, here shown as a part of the keyboard 12, may be actuated. Closure of switch 29 sets stage number 5 of the shift register 10, thereby inhibiting the then enabled one of the enabling gates 20A through 20M so that illuminated indicator lamp is denergized. At the same time, the recording of the binary number (including the control signal in stages 5 and 6) is initiated in a manner now to be described.

When stage 5 of the shift register 10 is set, an AND gate 31 passes a signal to a monostable multivibrator 33. In the circuit shown the period of the monostable multivibrator 33 is, nominally, 50 milliseconds. The normal output terminal of stage 5 is also connected, via selector switch 21I and an OR gate 34, to the anode of a relay driver RD 35, which may be a transistor as shown. The RD 35 is, therefore, energized when stage 5 is set, thereby to permit current to flow from a power source (not shown) through a relay winding 37, RD 35, a switch 29 and selector switch 21D to ground. The complementary output of the monostable multivibrator 33 is connected to a monostable multivibrator 33*a*, the normal output terminal of which is, via selector switch 21E, connected to the reset terminal of stage 5. It may be seen, therefore, that stage 5 may be set (when recording in the RC mode) for a time equal to the sum of the periods of the monostable multivibrators 33, 33*a*. The complementary output of the monostable multivibrator 33*a* is connected to an AND gate 31 as shown. Therefore, when the clock generator 18 causes the number in the shift register 10 to be serially unloaded, a "one" moved into stage 5 from one of the lower stages cannot cause monostable multivibrator 33 to recycle. Switch 39 is not essential to the invention since it is a conventional "End of Line" switch, opened only when the transducer 14 has reached the end of a track on its record medium 14*a*.

When the relay winding 37 is energized, its associated contact 37*a* is moved to its off-normal position to energize a motor 41 whenever a pair of conventional hook switches 43 are in their off-normal positions. The latter switches may, preferably, be actuated when a telephone handset (not shown) is removed from its cradle. It should be noted that when the hook switches are in their normal positions, a pair of double pole, single throw switches 45 and a switch 37 may be actuated to energize the motor 41 in either direction to position the record medium 14*a* relative to the transducer 14 in the manner described in the previously mentioned Kuehnle application. It should also be noted that an additional deck of the selector switch may be disposed in parallel with each one of the hook switches 43 so that, in the RM mode and in the RC mode, the motor 41 may be energized without removing the telephone handset from its cradle. Such a switch would, obviously, allow recording of information to be accomplished "off-line."

When the motor 41 is energized, it drives a cam 49 and, simultaneously, moves the record medium 14*a* with respect to the transducer 14. The cam 49 preferably is so arranged as to make one revolution in 100 milliseconds when the motor 41 is up to speed and its contour is such that a switch 41 is actuated approximately 40 milliseconds after closure of contact 37*a*. The motor 41 is, therefore, at its normal speed when switch 51 closes to apply, via selector switch 21F, an enabling signal to the clock generator 18. The latter produces clock pulses nominally spaced at successive intervals of slightly more than 10 milliseconds as long as the switch 51 is closed. Such clock pulses are, in turn, fed into the shift terminals of each stage in the shift register 10. Each successive clock pulse, therefore, shifts the bit stored in each stage in the shift register 10 one stage toward stage 6. It follows, then, that after the sixth clock pulse, all the information will have transferred through stage 6, via a pair of AND gates 6*a*, 6*b* also enabled by each clock pulse, to energize the transducer 14 in accordance with each bit in the binary number (including the "one" in stage 5) originally loaded into the shift register 10. The clock generator 18 is then inhibited by the opening of switch 51 and the energizing signal at the anode of RD 35 disappears (when switch 51 returns to its normal condition) so that the motor 41 is stopped. The circuit is then in condition to verify and record another digit.

It should be noted here that when the clock generator 18 is actuated to cause the information temporarily stored in the shift register 10 to be shifted, the motor 41 remains energized, via OR gate 34. This means that the operation of the switch 51 under the control of the cam 49 is the basic timing operation in this mode.

*"PM" mode of operation*

In the PM mode of operation, selector switches 21A through 21K are positioned in their second from the left positions. In such positions, selector switch 21A disables the keyboard 12; selector switch 21B connects transducer 14 to the input of stage 1 of the shift register, to an AND gate 59. Selector switch 21F transfers control of the clock generator 18 from the switch 51 to the normal output of stage 5 of the shift register 10, and selector switch 21I transfers control of the RD 35 from the monostatble multivibrators 33, 33*a* to a circuit later to be described.

It should be borne in mind that the first bit in every digit recorded in the record medium 14*a* is a "one" and that, as described in connection with the RM mode of operation, no recording occurs between digits. It follows, then, that if the transducer 14 is moved relative to the record medium 14*a*, the first bit detected by the transducer 14 will be a "one." It should also be borne in mind that, because of the manner in which the bits making up every digit were recorded, a transition will be detected by the transducer at about the middle of every recorded digit. Such a transition, whether positive or negative going, is utilized to synchronize the clock generator 18 from bit to detected bit, so that a clock pulse is produced only after a transition is detected.

When the circuit is to be actuated in the PM mode, operate switches 55*a*, 55*b* are moved to their off-normal positions. Such movement of switch 55*a* (shown adjacent to the keyboard 12) causes all stages of the shift register 10 (except stages 5 and 6) to be reset and causes stages 5 and 6 to be set. Stage 5, on setting, triggers monostable multivibrator 33 without, as will be seen hereinafter, permitting any output signal from either the row decoder 25 or the column decoder 27. Stage 6, being set, prevents a false "X-off" signal from stopping the motor 41. Movement of switch 55*b* sets, via selector switch 21H and a switch 69E, a flipflop 57. The latter, when set, enables an AND gate 59 thereby causing the RD 35, via selector switch 21I, to fire. The motor 41 is therefore energized as previously described. As a transducer 14 is moved by the motor 41 relative to the record medium 14*a*, the first bit (a "one") of the first recorded digit will be detected. This signal is connected to the input terminal of stage 1 of the shift register 10, to the AND gate 59 to reset stage 5 to start the clock generator 18. The latter, preferably, includes a gated free running oscillator having a natural period slightly longer than the interval between transitions recorded on the record medium 14*a*. It follows, then, that signals from the transducer 14 which occur just before the clock generator produces a clock pulse are shifted through the shift register 10. On the other hand, signals from the transducer 14 which occur when the free running oscillator is not ready to change its state will have no effect. It follows also then that successive bits detected by the transducer 14 are shifted into the shift register 10 until the first bit reaches stage 5 to set that stage. When stage 5 is set, the clock generator 18 is inhibited, monostable multivibrator 33 is triggered (thereby enabling the row decoder 25 and the column decoder 27) and AND gate 59 is enabled (preparing the shift register 10 for thee next succeeding digit).

When the clock generator 18 is inhibited the binary number then present in the shift register 10 remains in place. That is, stage 5 contains a "one" and stages 1 through 4 contain either a "one" or a "zero" depending on the number recorded in the record medium 14*a*. Further, since monostable multivibrator 33 is fired by a "one" in stage 5, the row decoder 25 and column decoder 27 are turned "on" during the astable period of the monostable multivibrator 33 so that the signal burst to be transmitted is limited in time to the period of that multivibrator.

It will be noted here that nothing in the circuit just described will have any effect on flipflop 57. In other words, the motor 41 remains energized, moving the transducer 14 relative to the record medium 14*a*. This means that when the next following "one" (which, of course, indicates the first bit of the next recorded digit) is detected by the transducer 14, the described operation is repeated, except that the switch 55*a* is ineffective. The function of the latter, i.e. resetting all the stages of the shift register 10, is accomplished by the signal representing the next following "one" through the AND gate 59. It follows that the flipflop 57 remains in its set state so that, as previously described, the transducer 14 continues to be moved relative motion with respect to the record medium 14*a*.

Any one of three events may, however, occur to reset the flipflop 57 to cause the motor 41 to be deenergized. The first such event is detection of recorded digit referred to as "X-Off," which means that it is desired to stop playback. That is, "X-Off" (in the PM mode) means that the motor 41 is to be deenergized and the monostable multivibrator 33 is to be inhibited. In the illustrated circuit "X-Off" is taken to be a "one" in stage 5 and a "zero" in all other stages of the shift register 10. A signal corresponding to such a state of the shift register 10 may be recorded in the PM mode after the pushbutton (not shown) on the keyboard 12 is depressed to actuate switches 23A, 23E. In the PM mode, the presence of an "X-Off" in the shift register 10 enables an AND gate 61 to pass a signal to the reset terminal of the flipflop 57. The latter upon resetting, inhibits AND gate 59 thereby finally deenergizing the motor 41 as described. Further, when AND gate 61 is enabled, an inverter 61*a* is energized to disable appropriate portions of the row decoder 25 and the column decoder 27 as will be described hereinafter. That is, an "X-Off" in the shift register 10 cannot cause the multifrequency oscillators to be triggered.

The second and third events which may occur to cause the motor 41 to be deenergized are an "End of Message" signal (here called EOM) and an "End of Line" signal (here called EOL). An EOM signal is recorded on the record medium 14*a* by actuation of a selected pushbutton of the keyboard 12. Such a signal is similar to an X-off signal in that it must ultimately shut off the motor 41, but it differs from an X-off signal in that it must first permit the row decoder 25 and the column decoder 27 to be actuated and the transducer 16 to be energized (when the circuit is in the RC mode).

An EOL signal is produced by movement of switch 39 to its off-normal position when the transducer 14 reaches the end of a track on the record medium 14*a*. Although the EOL signal is not recorded, any digit being played back when the EOL signal occurs must be played back completely to avoid error.

It follows from the foregoing that the effect of an EOM or an EOL signal must be delayed for a time sufficient for the last digit recorded on any track to be played back. The required delay is accomplished in the illustrated circuit by triggering a monostable multivibrator 63 to delay resetting flipflop 57 for a period equal to the period of the monostable multivibrator 63. The triggering signal produced by EOL is, as shown, derived from the switch 39 while the triggering signal produced by EOM is derived from a decoding matrix connected to the appropriate terminals of stages 1, 2, 3, 4, 5 of the shift register 10. It follows then, whether an EOL or an EOM signal occurs, the period of the monostable multivibrator 63 may be such that the last recorded digit on any track may be reproduced as required.

*"RC" mode of operation*

In this mode of operation the transducer 16 must be connected so as to be energized either by the transducer 14 (as signals recorded on the record medium 14*a* are reproduced) or by signals generated by actuation of the keyboard 12. To permit such operation, the selector switches 21A through 21K are positioned in their third from the left positions and a plurality of switches 69A through 69F are normally positioned as shown. It will be observed that, with the last-mentioned switches so positioned, the illustrated circuit is arranged to operate in the same way as in the PM mode, with the following exceptions: (a) signals detected by the transducer 14 are connected to the transducer 16 so that the latter transducer re-records signals detected by the former; (b) selector switches 21J, 21K are arranged to disconnect the multi-frequency generator from the telephone line T—T; and (c) the motor 41 is coupled, by any convenient clutch arrangement (not shown) to move the transducer 16 with respect to the record medium 16*a*. It follows then, that after a particular track on the record medium 14*a* has been selected by proper manipulation of switches 45, 47, actuation of switches 55*a*, 55*b* cause the selected prerecorded message to be transferred to the record medium 16*a*. When an X-Off, or an EOL signal occurs, the motor 41 shuts down as described hereinbefore, after the "X-off" or digit being read by transducer 14 has been recorded on the record medium 16*a*. The keyboard 12 (when actuated as described in connection with the RM mode of operation) is operated, a digit to be recorded is first displayed and verified. Switch 29 and switches 69A through 69F are then moved to their off-normal positions. As a result, then, the circuit operates in the same manner as described hereinbefore in connection with the RM mode of operation except that the transducer 16 replaces the transducer 14. It follows, then, that "invariant" information (meaning data recorded in the record medium 14*a*) and "variable" information (meaning information from the keyboard 12) may be recorded in the record medium 16*a*.

*"PC" mode of operation*

When it is desired to play back a composed and verified message from the record medium 16*a*, selector switches 21A through 21K are positioned in their far right positions. When the selector switches 21A through 21K are so positioned, operation is the same as in the PM mode of operation, except that the shift register 10 is fed by the transducer 16 rather than by the transducer 14. This means, in turn, that the clock generator 18 is synchronized by each bit recorded on the record medium 16*a* after the PC mode of operation is initiated by actuation of switches 55*a*, 55*b*. Further, since switch 39 is ineffective in the PC mode to prevent detection of any EOL signal and since selector switch 21I inhibits any "X-Off" signal from stopping the motor 41, only the occurrence of an EOM signal will reset flip-flop 57 to stop the motor 41. In other words, the transducer 16 will be moved relative to the record medium 16*a* until an EOM signal is detected and transmitted.

Reference has been made hereinbefore to the row decoder 25, the column decoder 27 and the multi-frequency oscillator. The decoders are essentially the same so only one, the row decoder, will be described in detail. Referring now to the row decoder 21 shown in FIG. 1A, it may be seen that it comprises four AND gates 71A through 71D, four AND gates 73A through 73D and an AND gate 75. At any instant, only one of the AND gates 71A through 71D passes a signal. For example, when a "one" is stored in stage 1 and a "zero" is stored in stage 2 of the shift register 10, only the AND gate 71A may pass a signal, the remaining AND gates 71B through 71D then being inhibited. In other words, AND gate 71A passes a signal when a "one" is stored in stage 1 and a "zero" is stored in stage 2 of the shift register 10. Following down through the AND gates 71B through 71D, it may be seen that AND gate 71B passes a signal when a "zero" is stored in stage 1 and a "one" is stored in stage 2; AND gate 71C passes a signal when a "one" is stored in stage 1 and a "one" is stored in stage 2; and that AND gate 71D passes a signal when a "zero" is stored in stage 1 and a "zero" is stored in stage 2. AND gates 71A through 71C are, as shown, connected directly to corresponding AND gates 73A through 73C, but AND gate 71D is connected, via AND gate 75, to its corresponding AND gate 73D. AND gate 75 in turn is enabled by the inverse of an "X-Off" signal. That is, AND gate 75 is enabled whenever there is a "one" stored in stage 1, 2, 3, or 4 of the shift register 10. It may be seen therefore, that even though AND gates 73A through 73D are all enabled by the monostable multivibrator 33, one and only one of the AND gates 73A through 73D may pass a signal to its corresponding oscillator 77A through 77D. The monostable multivibrator 33, as pointed out hereinbefore, is triggered by the first "one" in any digit and by the "one" inserted in stage 5 when switch 55*a* is actuated.

Even though actuation of switch 55*a* to start the PC mode has the same effect as loading an "X-Off" signal into the shift register 10 and any "X-Off" signal recorded on the record medium 16*a* will be loaded into the shift register 10, selector switch 21I in its PC position prevents flipflop 57 from being reset by an "X-Off" signal. At the same time, however, AND gate 75 is inhibited. It may be seen, therefore, that "X-Off" signals have no effect in the PC mode other than to cause the space between two successive transmitted characters to be lengthened by an amount equal to one character. It should also be noted here that when the shift register 10 is being loaded or unloaded monostable multivibrator 33 prevents any of the oscillators 77A through 77D from being triggered.

The column decoder 27, being similar in construction and operation to the row decoder 25 just described, operates in the same fashion as the row decoder 21. That is, whenever one of the oscillators 77A through 77D produces a pulse burst of frequency *f1*, *f2*, *f3*, or *f4*, the column decoder 27 similarly operates in accordance with the state of stage 3 and 4 of the shift register 10 to energize one of the oscillators 79A, 79B, 79C, 79D to produce a pulse burst of frequency *f5*, *f6*, *f7*, or *f8*. The result of the operation of the row decoder 25 and the column decoder 27 is, then, ultimately to produce a pulse burst according to a "two out of eight" frequency code corresponding to the binary number stored in stages 1, 2, 3, 4 of the shift register 10.

Although the particular embodiment of this invention just described may be used to compose, verify and transmit signals, it should be clearly understood that the invention should not be so limited. That is, it will be apparent to a person of skill in the art to utilize any of the many known printers in parallel with, or in place of, the illustrated display if it is desired to have a printed record of information transmitted or stored in either of the record mediums. It will also be apparent that the illustrated circuit may be expanded to process alphanumerics. Still further, it is apparent that the circuit may easily be adapted to receive frequency coded signals by using a conventional decoder in place of the illustrated keyboard. That is, it is apparent that the technique of loading the shift register in parallel does not require signals to be derived from manual operation of a keyboard. Still further it is apparent that, without changing the overall capabilities of the illustrated circuit, detailed portions may be changed. For example, the particular clock generator and the gating arrangement shown herein need not be used, it being evident that, in view of the fact that a "self-clocking" method of recording is here contemplated, clock or shift pulses need be independently generated only when recording from the keyboard. Such required clock or shift pulses obviously may be generated by an appropriate commutator driven by the motor. It is, therefore, felt that the invention should not be restricted to its disclosed embodiment but rather should be limited only by the spirit and scope of the appended claims.

What is claimed is:

1. Apparatus for composing messages to be transmitted from a station in a telephonic communication system, comprising:

(a) a first magnetic record medium;
(b) means for generating digital signals representative of a message to be transmitted;
(c) means for recording in the first magnetic record medium said digital signals representative of a message to be transmitted;
(d) means for visually displaying said message as it is recorded in said first magnetic record medium;
(e) means for verifying a displayed message including means for correcting data stored in said first record medium;
(f) a second magnetic record medium operative to store a verified message;
(g) means for recording digital signals from said first record medium in said second record medium when said data is verified, and for selectively recording in said second record medium digital signals from said generating means; and
(h) means for converting the digital signals recorded in said second record medium to signals adapted for transmission through a telephonic communication system.

2. Apparatus as in claim 1 wherein:

(a) the means for generating digital signals include:
  (i) a matrix of pushbuttons; and
  (ii) encoding means, responsive to actuation of any one of the pushbuttons in the matrix thereof, sequentially, to produce a parallel binary number indicative of the particular pushbutton actuated and an enabling signal; and
(b) the means for recording the digital signals include:
  (i) storage means, including a shift register, for temporarily storing the parallel binary number and the enabling signal;

(ii) a first magnetic head in operative relationship with respect to the first magnetic record medium; and (iii) control means, actuated when the enabling signal is first temporarily stored in the shift register, sequentially to move the first magnetic record medium relative to the first magnetic head, to shift the enabling signal and the parallel binary number out of the shift register serially to energize the first magnetic head as it moves relative to the first magnetic record medium, thereby to record the enabling signal and the temporarily stored parallel binary number in the first magnetic record medium, and, finally, to stop the movement of the first magnetic head relative to the first magnetic record medium when the last bit of the temporarily stored digital number is recorded in the first magnetic record medium.

3. Apparatus as in claim 2 having, in addition, means disposed between the shift register and the first magnetic head for encoding each bit shifted out of the shift register to provide, when each bit is reproduced, a self-clocking signal.

4. Apparatus as in claim 3 having, in addition, means, responsive to the enabling signal and the parallel binary number temporarily stored in the shift register, for displaying such parallel binary number in a human-readable form.

References Cited

UNITED STATES PATENTS

| | | | |
|---|---|---|---|
| 2,827,623 | 3/1958 | Ainsworth | 340—172.5 |
| 3,131,259 | 4/1964 | Di Iorio et al. | 179—2 |
| 3,166,636 | 1/1965 | Rutland et al. | 178—24 |
| 3,166,736 | 1/1965 | Heminger | 340—172.5 |
| 3,280,256 | 10/1966 | Clark et al. | 178—79 |
| 3,328,764 | 6/1967 | Sorensen et al. | 340—172.5 |
| 3,340,354 | 9/1967 | Lodenkamp | 178—4 |

FOREIGN PATENTS

| | | |
|---|---|---|
| 722,793 | 11/1965 | Canada. |

PAUL J. HENON, *Primary Examiner.*

J. P. VANDENBURG, *Assistant Examiner.*

U.S. Cl. X.R.

235—61.11; 340—174.1